United States Patent [19]

Miyaura et al.

[11] Patent Number: 4,744,032
[45] Date of Patent: May 10, 1988

[54] TRANSMISSION RATIO CONTROL APPARATUS OF TOROIDAL TYPE INFINITELY VARIABLE TRANSMISSION

[75] Inventors: Yasuhiko Miyaura, Gumma; Hisashi Machida, Maebashi, both of Japan

[73] Assignee: Nippon Seiko Kabushiki Kaisha, Tokyo, Japan

[21] Appl. No.: 757,079

[22] Filed: Jul. 19, 1985

[30] Foreign Application Priority Data

Jul. 20, 1984 [JP] Japan .................................. 59-150760

[51] Int. Cl.[4] ...................... G05D 17/02; F16H 15/08; B60K 41/18
[52] U.S. Cl. .................................. 364/424.1; 74/200; 74/690; 74/866
[58] Field of Search ............... 364/424.1; 74/198, 200, 74/201, 690, 866, 691

[56] References Cited

U.S. PATENT DOCUMENTS

| 4,434,676 | 3/1984 | Horton | 74/200 |
| 4,499,782 | 2/1985 | Perry | 74/200 |
| 4,526,051 | 7/1985 | Kraus | 74/200 |
| 4,537,086 | 8/1985 | Okoshi | 74/200 |
| 4,587,866 | 5/1986 | Kraus | 74/691 |
| 4,638,691 | 1/1987 | Tanaka | 74/866 |

Primary Examiner—Felix D. Gruber
Attorney, Agent, or Firm—Arnold S. Weintraub

[57] ABSTRACT

A tilting angle detector detects a tilting angle of the power rollers which perform the transmission operation of a toroidal type infinitely variable transmission. Based on the detecting signal and a command value signal from command value selecting means for selecting a command value of the transmission ratio, control means controls the power rollers to tilt. In this control, correction means corrects at least one of the detecting signal of the tilting angle detector and the command value signal of the command value selecting means so that a relationship of the transmission ratio with respect to the tilting angle becomes linear, and thus the gain at each transmission ratio is made equal.

5 Claims, 9 Drawing Sheets

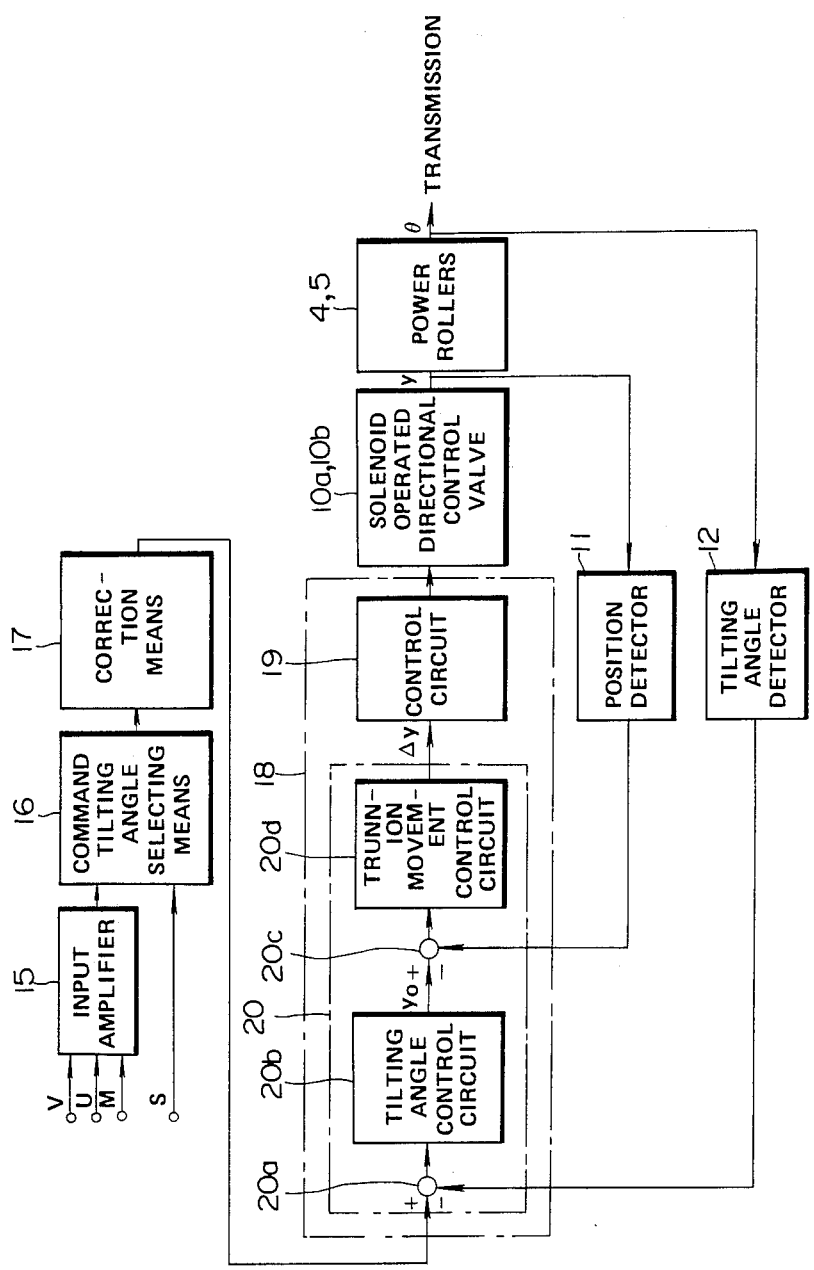

TRANSMISSION RATIO CONTROL APPARATUS OF TOROIDAL TYPE INFINITELY VARIABLE TRANSMISSION

BACKGROUND OF THE INVENTION

1. Field of the Invention:

The present invention relates to a transmission ratio control apparatus of a toroidal type infinitely variable transmission, and in particular to such a control apparatus in which it is arranged to perform a accurate transmission control by making linear a relationship between the transmission ratio and a tilting angle of power rollers.

2. Prior Art:

A conventional toroidal type infinitely variable transmission is disclosed, for example, in U.S. Pat. No. 4,434,675.

Firstly, an arrangement of the toroidal type infinitely variable transmission exhibiting the principles thereof will be described with reference to FIG. 9. Reference numeral 1 designates a housing, and an input disk 2 and an output disk 3 are coaxially and rotatably mounted in the housing 1. The input disk 2 and output disk 3 are of an identical shape to each other and are disposed in line symmetry so that toroidal surfaces are formed having a circular cross section by opposing faces of the input and output disks 2, 3 cooperating with each other. And within a toroidal cavity formed by the toroidal surfaces of the input disk 2 and output disk 3, there are disposed with a pair of power rollers 4 and 5 which are respectively rotatably in engagement with both the disks 2 and 3.

These power rollers 4 and 5 are rotatably mounted on trunnions 6 and 7 respectively, and at the same time each of the power rollers 4 and 5 is supported pivotally with respect to a pivot axis O which is also the center of the toroidal surfaces formed by the input disk 2 and output disk 3.

And a viscous material having a large frictional resistance is coated on the contact surfaces between the input disk 2 and the power roller 4 and between the output disk 3 and the power roller 5, and rotatory power imparted to the input disk 2 is transmitted to the output disk 3 through the power rollers 4 and 5. The transmission ratio, that is, the speed changing ratio is changed by changing the tilting angle $\theta$ of each of the power rollers 4 and 5 by means of the trunnions 6 and 7. In other words, supposing that the power rollers 4 and 5 are in a horizontal condition with the tilting angle $\theta = 0$ as shown by the solid lines in FIG. 9, since a radius r of the input disk 2 at the contact position with the power rollers 4 is equal to that of the output disk 3 at the contact position with the power roller 4, and since these relationships are also true among the power roller 5, input disk 2 and output disk 3, the transmission ratio is 1:1. From this condition, when the power rollers 4 and 5 are rotated by an $(-\theta)$ respectively clockwisely and counterclockwisely, the transmission ratio is increased with an increase in the tilting angle $\theta$. In contrast, when the power rollers 4 and 5 are rotated by an angle $(+\theta)$ respectively counterclockwisely and clockwisely to positions indicated by chain lines in FIG. 9, the transmission ratio is decreased with an increase in the tilting angle $\theta$ in these angular directions. Accordingly, a desired transmission ratio can be obtained by controlling the tilting angle $\theta$ of each of the power rollers 4 and 5.

In this respect, in the conventional arrangement described in the foregoing, it is designed to move each of the trunnion in the pivot axis direction by operating hydraulic cylinders provided at opposite ends of each trunnion by a control valve thereby to tilt and pivot the power rollers. In this case the tilt and pivot movement of the power rollers is detected by a precess cam and the detected tilt and pivot movement is fed back to the control valve to control the transmission ratio to a desired value.

However, in the conventional toroidal type infinitely variable transmission described above, a relationship between the tilting angle $\theta$ of each of the power rollers 4 and 5 and the transmission ratio assumes, as shown in FIG. 10, a non-linear relationship of a hyperbolic characteristic. As a result, when it is applied, for example, to a transmission for transmitting the engine rotatory power of an automobile to the wheels, and when a servo control is performed by detecting the tilting angle $\theta$ of each of the power rollers 4 and 5, a gain of the transmission ratio becomes high in the speed increasing side of the transmission ratio as compared with the speed reducing side. Due to this fact, as shown in FIG. 11, the engine speed is forced to decrease undesirably, and thus a problem arises in which a comfortable ride is deteriorated.

OBJECTS OF THE INVENTION

An object of the present invention is to provide a transmission ratio control apparatus of a toroidal type infinitely variable transmission which is capable of performing smooth transmission operation by correcting a non-linear relationship between a tilting angle of the power rollers and the transmission ratio to achieve a linear relationship.

Another object of the present invention is to provide a transmission ratio control apparatus of a toroidal type infinitely variable transmission which is capable of controlling a tilting angle of the power rollers accurately irrespective of whether the control is carried out in an open-loop control fashion or a closed-loop control fashion.

SUMMARY OF THE INVENTION

In accordance with the present invention, the non-linear relationship caused between the tilting angle of the power rollers and the transmission ratio in the toroidal type infinitely variable transmission is corrected to obtain the linear relationship by correcting the command tilting angle or the detection signal of a tilting angle detector, and the tilting angle of the power rollers is controlled based on the corrected linear relationship. As a result, it is advantageous in that the transmission ratio can be controlled accurately, and variations in the load torque at the rotation input side can be prevented. The present invention will be described in more detail with reference to the drawings.

BRIEF DESCRIPTION OF DRAWINGS

FIG. 6 is a block diagram showing a control system of the present invention;

DETAILED DESCRIPTION OF PREFERRED EMBODIMENTS

Embodiments of the present invention will be described hereinafter with reference to the drawings.

FIGS. 1 to 7 illustrate embodiments of the present invention.

Figure 1:
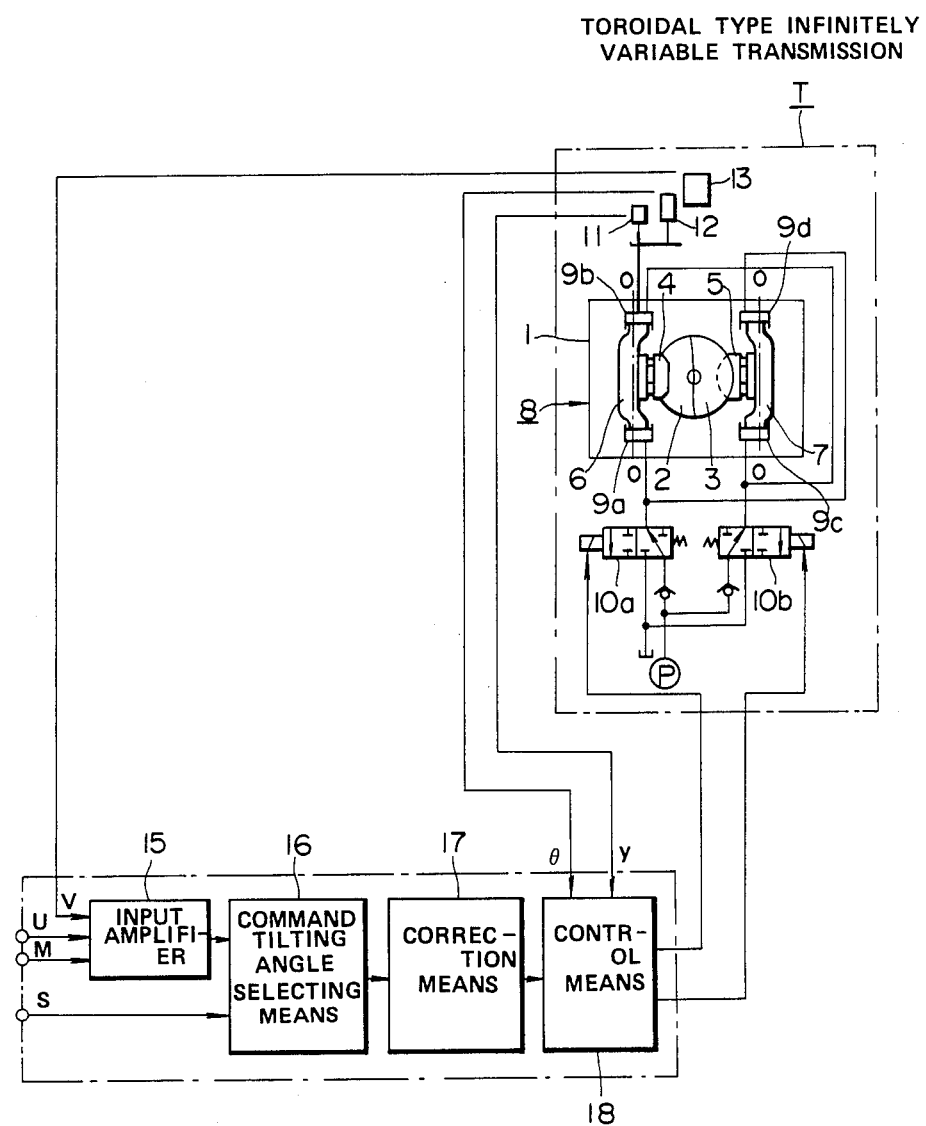
FIG. 1 is a schematic block diagram of an embodiment of an apparatus in accordance with the present invention.

First, an arrangement will be described. In Fig. 1, letter T designates a toroidal type infinitely variable transmission, and C designates a control apparatus.

The toroidal type infinitely variable transmission T includes, similar to the conventional toroidal type infinitely variable transmission described in the foregoing, U.S. Patent a transmission main body 8 having a housing 1, input disk 2, output disk 3, power rollers 4, 5 and trunnions 6, 7, and includes hydraulic cylinders 9a to 9d for moving each of the trunnions 6, 7 by a small distance in a pivot axis O-O direction, a pair of solenoid operated directional control valves 10a, 10b for controlling the hydraulic supply to the hydraulic cylinders 9a to 9d, a position detector 11 such as a potentiometer or the like for detecting a displaced position of the trunnion 6, a tilting angle detector 12 for detecting a tilting angle θ of the power roller 4, and a vehicle speed detector 13 for detecting a number of rotations of the output disk 3 to output a detection signal corresponding to a vehicle speed.

The control apparatus C is comprised of an input amplifier 15 supplied with various detection signals which are used as references for selecting a transmission ratio, command tilting angle selecting means 16, correction means 17, and control means 18.

Figure 2:
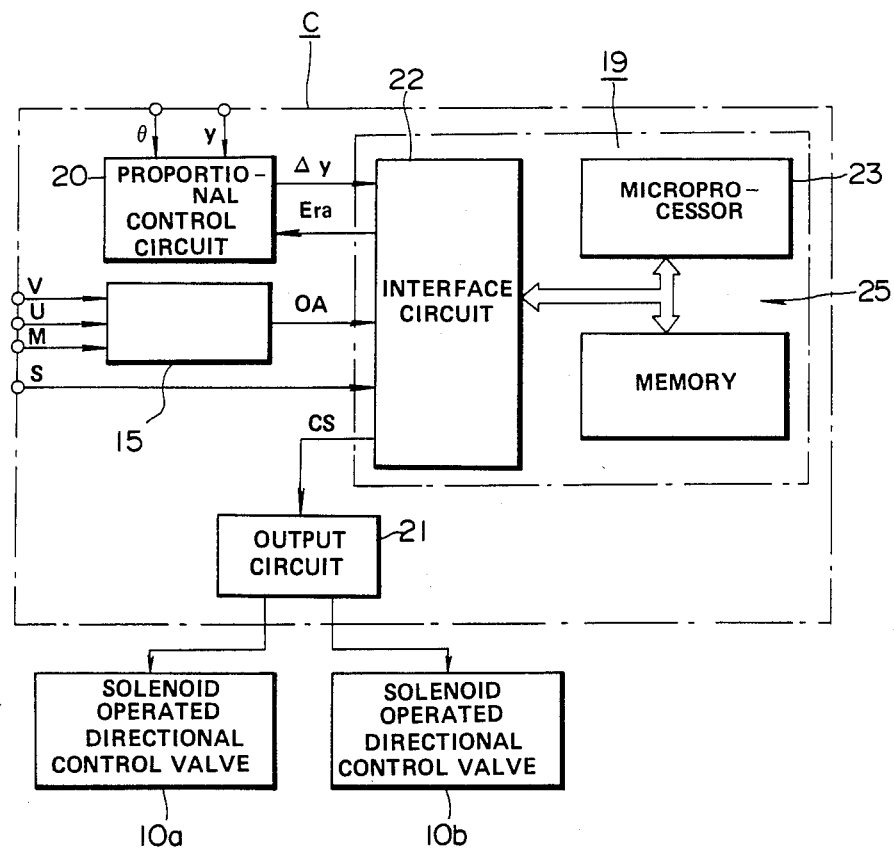
FIG. 2 is a block diagram of an example of the control apparatus in FIG. 1.

A concrete arrangement of the control apparatus C includes, as shown in FIG. 2, a control circuit 19, a proportional control circuit 20 and an output circuit 21.

The input amplifier 15 is supplied with a throttle valve opening position detecting signal U, a power economy mode selection signal M, and the detection signal V of the vehicle speed detector 13 of the toroidal type infinitely variable transmission T, and these signals which serve as references for the selection of the transmission ratio are amplified by amplifier having predetermined gain values. Among these signals, the throttle valve opening position detecting signal U and the power-economy mode selection signal M are supplied externally.

The control circuit 19 is, for example, comprised of a microcomputer 25 including an interface circuit 22, microprocessor 23, and a memory 24, and the microcomputer 25 performs a predetermined calculation and processing based on the input signals supplied to the interface circuit 22, and calculates a command tilting angle correction value Era and supplies this correction value to the proportional control circuit 20. At the same time, the microcomputer 25, in order to control the tilting angle θ of the power rollers 4, 5 based on a control signal Δy applied from the proportional control circuit 20, outputs to an output circuit 21 a drive control signal CS which controls movement of the trunnions 6, 7.

The interface circuit 22 is provided with A/D conversion and D/A conversion functions, and is supplied at the input side thereof with an externally supplied shift position detecting signal S, an output signal OA of the input amplifier 15, and the proportional control signal Δy of the proportional control circuit 20. The outputs of the interface circuit 22, are connected with the command value input side of the proportional control circuit 20 and the output circuit 21.

The microprocessor 23 executes the calculation and processing based on the input signals supplied to the interface circuit 22 and in accordance with a predetermined processing program stored in the memory 24 beforehand, and ultimately selects the drive control signal CS for driving the trunnions 6, 7 of the toroidal type infinitely variable transmission.

The memory 24 stores processing programs required to perform the calculation and processing of the microprocessor 23, and at the same time, stores various constants required in the course of the processing by the microprocessor 23, and further stores sequentially the processing results produced in the course of the processing by the microprocessor 23.

Next, referring to FIGS. 3a and 3b, the processing procedures of the microprocessor 23 will be described.

Figure 3A:
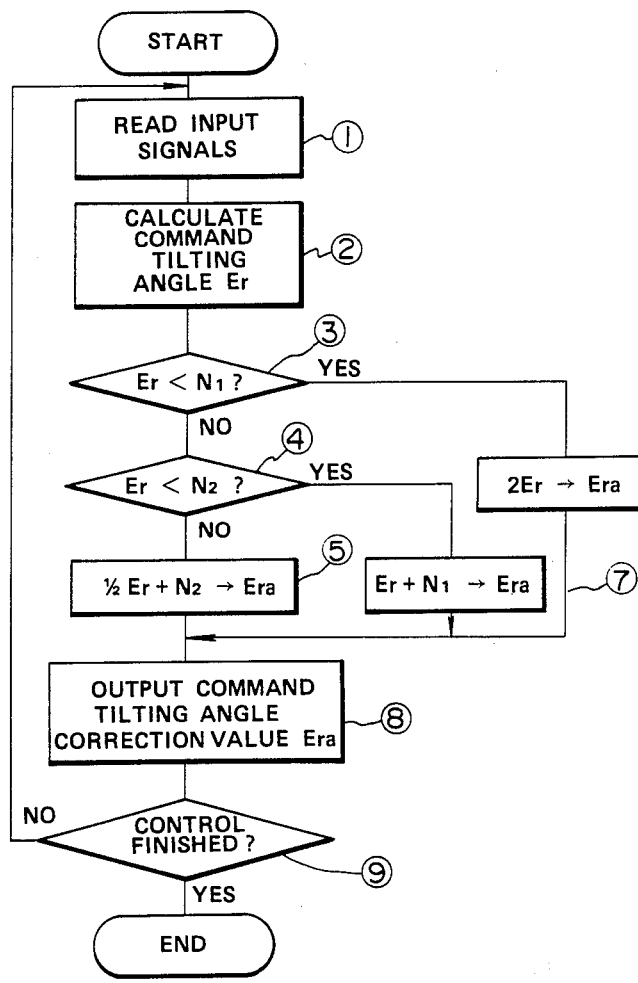
FIGS. 3a and 3b are flow charts of an example of processing procedure performed by the control apparatus.

The microprocessor 23 normally executes a main program shown in FIG. 3a, and executes at each predetermined time a timer interruption processing shown in FIG. 3a.

In the main program, firstly, in step the ①, the output signal OA of the input amplifier 15 and the shift position detecting signal S are read, these signals being used as references for calculating the command tilting angle, and next, it proceeds to step ② in which the command tilting angle Er is calculated either by looking up a storage table stored in the memory 24 based on the read signals or by substituting the read signals in a predetermined calculation formula, and the calculated command tilting angle Er is stored temporarily in a predetermined storage area in the memory 24.

The storage table for the values of Er is set forth in Table 1 where U represents various throttle openings and V is vehicle speed.

TABLE I

| V | U | | | | |
|---|---|---|---|---|---|
| | $U_0$ | $U_1$ | $U_2$ | $U_3$ | $U_4$ |
| 0 | Er min | Er min | Er min | Er min | Er min |
| $V_{s0}$ | $Er_{01}$ | Er min | Er min | Er min | Er min |
| $V_{s1}$ | $Er_{02}$ | $Er_{11}$ | Er min | Er min | Er min |
| $V_{s2}$ | $Er_{03}$ | $Er_{12}$ | $Er_{21}$ | Er min | Er min |
| $V_{s3}$ | $Er_{04}$ | $Er_{13}$ | $Er_{22}$ | $Er_{31}$ | Er min |
| $V_{s4}$ | $Er_{05}$ | $Er_{14}$ | $Er_{23}$ | $Er_{32}$ | $Er_{41}$ |
| $V_{e0}$ | $Er_{06}$ | $Er_{15}$ | $Er_{24}$ | $Er_{33}$ | $Er_{42}$ |
| . | Er max | . | . | . | . |

TABLE I-continued

| V | $U_0$ | $U_1$ | $U_2$ | $U_3$ | $U_4$ |
|---|---|---|---|---|---|
| . | . | . | . | . | . |
| $V_{e1}$ | Er max | $Er_{1I}$ | $Er_{2(I-m)}$ | $Er_{3(I-n)}$ | $Er_{4(I-o)}$ |
| . | Er max | Er max | . | . | . |
| . | . | . | . | . | . |
| $V_{e2}$ | Er max | Er max | $Er_{2J}$ | $Er_{3(J-n)}$ | $Er_{4(J-o)}$ |
| . | Er max | Er max | Er max | . | . |
| . | . | . | . | . | . |
| $V_{e3}$ | Er max | Er max | Er max | $Er_{3K}$ | $Er_{4(K-o)}$ |
| . | Er max | Er max | Er max | Er max | . |
| . | . | . | . | . | . |
| $V_{e4}$ | Er max | Er max | Er max | Er max | $Er_{4L}$ |
| $V_{e4+x}$ | Er max | Er max | Er max | Er max | Er max |

Where,
Er min < Er 01 < Er 02 < ... < Er 06 < Er max
Er min < Er 11 < Er 12 < ... < Er 15 < Er 11 < Er max
Er min < Er 21 < Er 22 <
... < Er 24 < Er 2(i−m) < Er 2(j−m) < Er max
Er min < Er 31 < Er 32 < Er 33 <
... < Er 3(i−n) < Er 3(j−n) < Er 3k < Er max
Er min < Er 41 < Er 42 <
... < Er 4(i−o) < Er 4(j−o) < Er 4(k−o) < Er 41 > Er max The tilting angle can also be calculated according to the following equation:

$$Er = \frac{-b + \sqrt{b^2 - 4a\{c - NEi/V\}}}{2a}$$

as derived from FIG. 5 herein, wherein a, b and c are constant and NE represents engine speeds.

Next, in step to ③ to ⑦, correction processing is executed. In this correction processing, first, in step ③, the command tilting angle Er stored in the step 2 is read out, and determines whether this value Er is less than a predetermined set value $N_1$ or not. If the result of the determination is Er ≧ $N_1$, then proceeds to step ④. In the step ④, similarly, it is determined whether the command tilting angle Er is less than a predetermined set value $N_2$ or not, and if Er ≧ $N_2$, then proceeds to step ⑤, and the command tilting angle Er and the predetermined set value N are read, and the command tilting angle correction value Era is calculated based on these read data and in accordance with the following formula (1), and proceeds to next step ⑧ after storing the calculated correction value Era temporarily in a predetermined storage area in the memory 24.

$$Era = \tfrac{1}{2}Er + N_2 \quad \ldots (1)$$

Further, in the step ③, if Er < $N_1$, proceeds to step ⑥, and the command tilting angle correction value Era is calculated in accordance with the following formula (2), and proceeds to step ⑧ after storing the calculated correction value Era temporarily in a predetermined storage area in the memory 24.

$$Era = 2Er \quad \ldots (2)$$

Further, in the step ④, if Er < $N_2$, then proceeds to step ⑦, and the command tilting angle correction value Era is calculated in accordance with the following formula (3), and proceeds to step ⑧ after storing the calculated correction value Era temporarily in a predetermined storage area in the memory 24.

$$Era = Er + N_1 \quad \ldots (3)$$

Here, the calculation of the command tilting angle correction value Era in each of the steps ⑤, ⑥ and ⑦ is aimed at to obtain the correction value to correct the non-linear relationship between the tilting angle θ and the transmission ratio R in the following manner. As shown in FIG. 5a since the relationship between the tilting angle θ and the transmission ratio R is non-linear, in accordance with the characteristic curve of Era shown in FIG. 4, the tilting angle θ is corrected as shown in Fig. 5b thereby to obtain a linear relationship between the tilting angle θ and the transmission ratio R as shown in FIG. 5c.

Next, in step ⑧, the command tilting angle correction value Era stored in each of the steps ⑤, ⑥ and ⑦ is outputted to the proportional control circuit 20 and then proceeds to step ⑨.

In the step ⑨, it is determined whether the control mentioned above is to be finished or not, and if the control is to be continued, then returns to the step ①, and if the control is to be finished, the processing is terminated as it is.

Figure 3B:
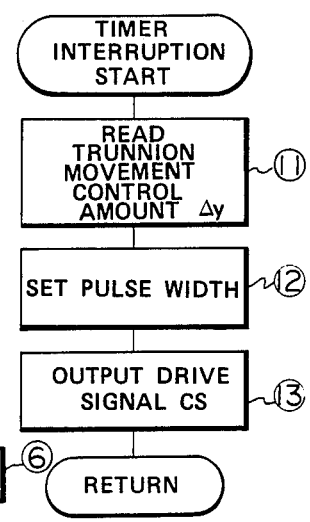

Further, in the timer interruption processing, as shown in FIG. 3b, in step ⑪, the trunnion movement control amount Δy outputted from the proportional control circuit 20 is read, and then proceeds to step ⑫, and based on the trunnion movement control amount Δy, a pulse width conversion table stored in the memory 24 is looked up, and on the basis of the obtained value, a pulse width of the drive control signal CS for controlling the solenoid operated directional control valves 10a, 10b is calculated, and then proceeds to step ⑬ after storing the calculated pulse width in a predetermined storage are in the memory 24.

In the step ⑬, the drive control signal CS of the pulse width stored in the step ⑫ is outputted to the solenoid operated directional control valves 10a and 10b, and then finishes the timer interruption processing and returns to the main program.

Here, it should be noted that the processing in the step ② is a concrete example performed by the command value selecting means 16 (in FIG. 1), the correction processing in the steps ③ to ⑦ is a concrete example performed by the correction mean 17, and the processing in the step ⑧ and ⑪ to ⑬ including the function of the proportional control circuit 20 is a concrete example performed by the control means 18.

Further, the proportional control circuit 20 is supplied with the detecting signal y of the trunnion position detector 11 of the infinitely variable transmission T, the detecting signal θ of the tilting angle detector 12, and the command tilting angle correction value Era from the correction means 17 in the control circuit 19, and based on these signals, outputs the trunnion movement control amount Δy for moving the trunnions 6, 7 by a predetermined amount. Here, the proportional control circuit 20 includes, as shown in the block diagram in FIG. 6, a subtractor 20a supplied with the command tilting angle correction value Era and the detecting signal θ of the tilting angle detector 12, a tilting angle control circuit 20b supplied with a difference output from the subtractor 20a for calculating a trunnion movement amount $Y_0$ based on the difference output, a subtractor 20c supplied with the trunnion movement amount $Y_0$ and the detecting signal y of the position detector 11, and a trunnion movement control circuit 20d for calculating the trunnion movement control amount $\Delta y$.

Next the operation will be described. Supposing that the vehicle is in a stopping condition, and the shift position detection signal S indicating a neutral range is being outputted. In this condition, the engine is idling, and since the engine rotary power is not transmitted to the input disk 2 of the infinitely variable transmission T, in the microprocessor 23 in the control circuit 19 (FIG. 2), that is, in the processing in FIGS. 3a and 3b, it is dealt with as the command value =0, since the vehicle speed is zero.

From this condition, for example, when the vehicle is started by selecting a drive range, and at the same time, stepping down on the accelerator pedal and making the clutch transmit the power incompletely, the execution of the processing shown in FIGS. 3a and 3b is started, and firstly, in step ①, the shift position detecting signal S indicative the drive range, the detecting signal U of the throttle valve opening position due to the stepping down on the accelerator pedal, and the detecting signal V of the number of rotations of the output disk 3 of the infinitely variable transmission T are read, and these signals are stored temporarily in a predetermined storage area in the memory 24, and then the command tilting angle Er is calculated and is stored temporarily in a predetermined storage area in the memory 24 (step ②). At this time, since the vehicle is in a starting and accelerating condition, the value of the command tilting angle Er assumes a relatively low value.

Next, in step ③, the correction processing is carried out. However, since the value of the command tilting angle Er stored in the predetermined storage area in the memory 24 in step ② is low, in step ④ it is determined that Er $<N_1$, and thus proceeds to step ⑥ and the calculation of the formula (2) is carried out, and the command tilting angle correction value Era which is two times as large as the command tilting angle Er is calculated, and the calculated value is stored temporarily in the predetermined storage area in the memory 24.

Next, in step ⑧, the command tilting angle correction value Era is outputted to the proportional control circuit 20, and then proceeds to step ⑨, and where the control is to be continued, returns to step ①.

In this manner, when the command tilt angle correction value Era is outputted to the proportional control circuit 20 (FIG. 6), first, in the proportional control circuit 20, the detecting signal $\theta$ from the tilting angle detector 12 of the infinitely variable transmission T is compared with the command tilting angle correction value Era to calculate the difference therebetween, and the resulting error signal is supplied to the tilting angle control circuit 20b to calculate the trunnion movement amount $Y_0$, and this trunnion movement amount $Y_0$ is compared with the detecting signal y from the trunnion movement amount detector 11 to calculate the difference therebetween, and the resulting error signal is supplied to the trunnion movement amount control circuit 20d to calculate the trunnion movement control amount $\Delta y$, and then this control amount $\Delta y$ is outputted to the control circuit 19.

In the control circuit 19, the timer interruption processing is executed at each predetermined time, and in step ⑪, the trunnion movement control amount $\Delta y$ is read, and then in step ⑫, based on the value of the trunnion movement control amount $\Delta y$, a trunnion movement amount storage table is looked up to thereby determine the pulse width of the drive control signal CS for driving the solenoid operated directional control valves 10a and 10b, and the determined pulse width is stored in the predetermined storage area in the memory 24.

Next, in step ⑬, the drive control signal CS consisting of a pulse width modulation signal of the pulse width determined in the step ⑫ is outputted to the solenoid operated directional control valves 10a and 10b, and then after finishing the interruption processing returns to the main program.

In this manner, when the drive control signal CS is supplied to the solenoid operated directional control valves 10a and 10b the change-over of these control valves 10a and 10b are controlled in accordance with the pulse width of an ON condition of the drive control signal CS, and the trunnions 6 and 7 are moved by a predetermined amount.

Then, when the trunnions 6, 7 are moved, the power rollers 4, 5 are tilted depending on the direction of the movement of the trunnions 6, 7, and the tilting angle $\theta$ is changed. Thus, the transmission ratio R is controlled to achieve a desired value.

More specifically, when the command tilting angle correction value Era is outputted to the proportional control circuit 20 from the microcomputer 25, in this proportional control circuit 20 (FIG. 6), the difference between the command tilting angle correction value Era and the tilting angle detecting signal $\theta$ is obtained, and by supplying this difference to the tilting angle control circuit 20b the trunnion movement control amount $Y_0$ is calculated. Then, the difference between the calculated trunnion movement amount $Y_0$ and the trunnion position detection signal y is obtained, and by supplying the difference signal to the trunnion movement control circuit 20d, the movement control amount $\Delta y$ for operating the trunnions is calculated and supplied to the microcomputer 25. In this manner, when the movement control amount $\Delta y$ is inputted to the microcomputer 25, a predetermined calculation and processing are executed, and the drive control signal CS having the pulse width corresponding to the calculated result is outputted. The trunnions 6, 7 are started to move by the drive control signal CS followed by the start of tilting of the power rollers 4, 5 resulting in the change in the tilting angle $\theta$. Thus, the transmission ratio R is changed.

At this time, the moved position of the trunnions 6, 7 is detected by the position detector 11, and when the trunnion movement amount becomes equal to a predetermined amount as a result of negative feedback of the trunnion movement position detecting signal y, the trunnion movement control amount $\Delta y$ becomes zero, and the supply of the drive control signal CS is stopped and the movement of the trunnions is also stopped.

However, although the movement of the trunnions is stopped, the power rollers 4, 5 continue to tilt, and thus the tilting angle detecting signal $\theta$ is detected by the tilting angle detector 12. Since, this detecting signal $\theta$ is being fed back negatively to the command tilting angle correction value Era from the microcomputer 25, both the trunnion movement amount $Y_0$ and the trunnion movement control amount $\Delta y$ assume respectively opposite directions vectorwisely as compared with the respective previous amounts. As a result, since this trunnion control amount Δy is supplied to the microcomputer 25, the drive control signal CS which acts to move the trunnions in the returning direction is supplied to the output circuit 20, and the trunnions start returning operation towards their neutral points.

And due to the negative feedback of the trunnion movement position detecting signal y, when the trunnion returning amount reaches a predetermined amount, the trunnion movement control amount Δy becomes zero, and the supply of the drive control signal CS from the microcomputer 25 is stopped, and thus the trunnion returning operation is stopped. At this time, since the trunnions are at their neutral positions, the tilting of the power rollers 4, 5 is stopped, and the transmission operation is completed. By tilting the power rollers in the series of operations as described in the foregoing, the transmission ratio is controlled accordingly.

Figure 7:
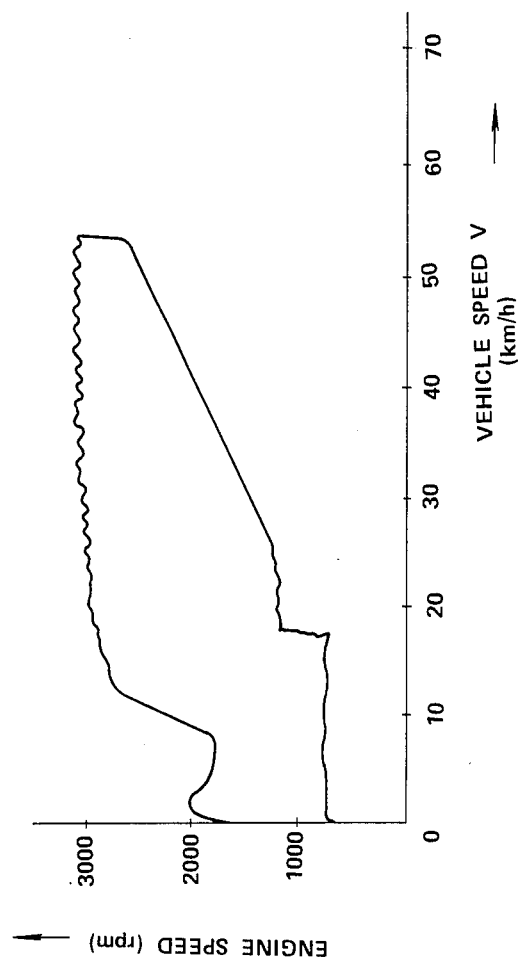
FIG. 7 is a graph showing a relationship between a vehicle speed and an engine rpm when the present invention is applied to a transmission for vehicles.

The control operations described above are repeated, and it is possible to control the transmission ratio R of the infinitely variable transmission T so that the transmission ratio follows accurately a predetermined transmission ratio based on the throttle valve opening position signal, economic power mode signal, shift position detecting signal, etc. And in this case, since the transmission ratio control is performed under the condition in which the relationship between the tilting angle $\theta$ and the transmission ratio R is made linear, the control gain at each tilting angle position becomes a constant value. Accordingly, when the transmission control apparatus is applied to a transmission of an automobile, since the relationship between the vehicle speed and the engine speed is substantially linear in a steady running condition as shown in FIG. 7, the riding comfort in the vehicle can be improved.

Figure 4:
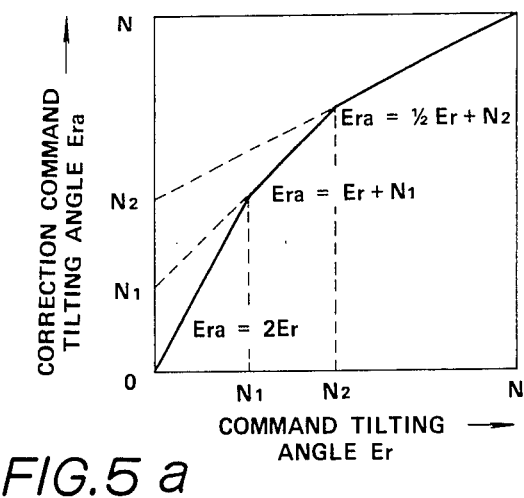
FIG. 4 is a graph showing a relationship between a target tilting pivot angle and a target tilting pivot angle correction value.
Figure 5A:
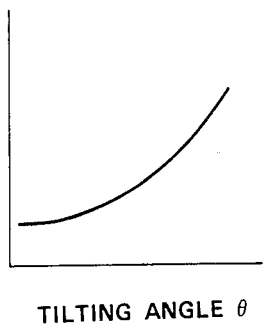
FIGS. 5a to 5c are graphs for explaining the principles of the present invention.
Figure 5B:
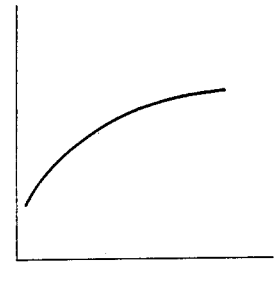
Figure 5C:
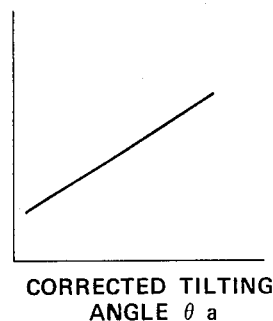

Further, in the embodiment described in the foregoing, in correcting the command tilting angle Er so that the relationship between the actual tilting angle $\theta$ and the transmission ratio R is made linear, an actually operable range of the command tilting angle $\theta$ is divided into three, and the correction is carried out in accordance with three different function curves respectively for the three divided ranges (FIG. 4). However, the divisor of the range of the command tilting angle Er may be an arbitrary number, and as the divisor becomes large, the relationship between the tilting angle and the transmission ratio can be made linear more accurately. Furthermore, the correction of the command tilting angle Er may be carried out, in place of the use of the predetermined function curves, by storing in the memory 24 in the microcomputer 25 beforehand a storage table for converting the command tilting angle into the command tilting angle correction value Era or a storage table of the command tilting angle modified with an anticipated correction value, and by looking up these storage tables to calculate the command tilting angle correction value Era from the command tilting angle Er. Alternatively, the calculation of the command tilting angle correction value Era may be made directly based on the input signals.

Figure 8:
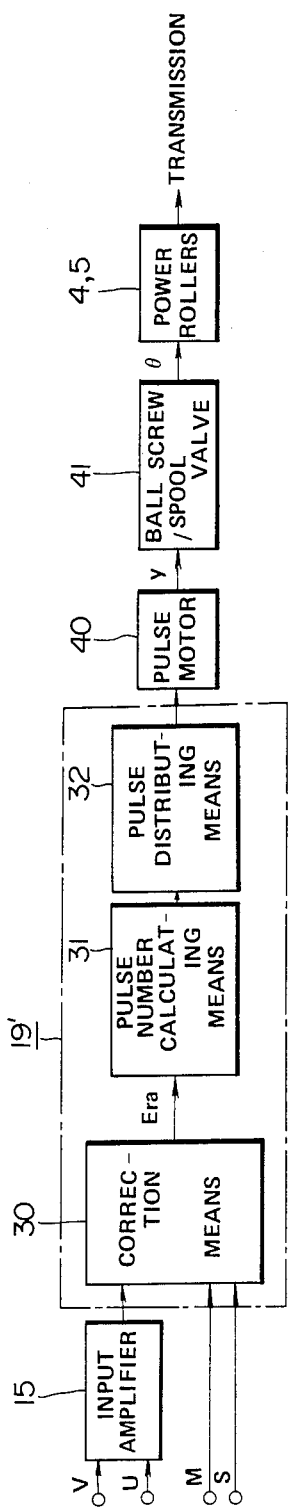
FIG. 8 is a block diagram of another embodiment of the present invention.
Figure 9:
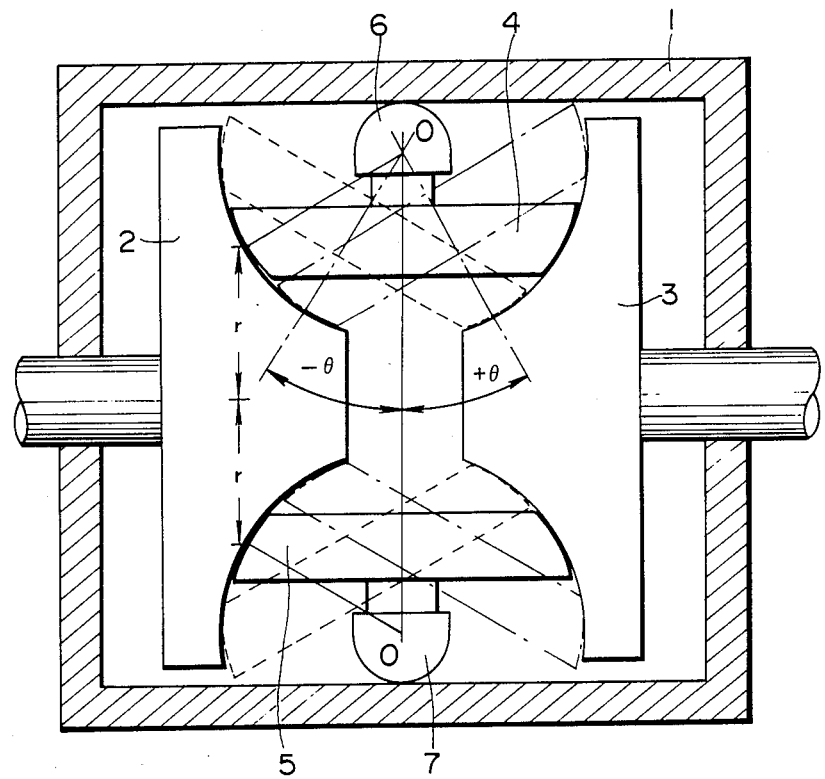
FIG. 9 is a sectional view showing the structure of a conventional toroidal type infinitely variable transmission.
Figure 10:
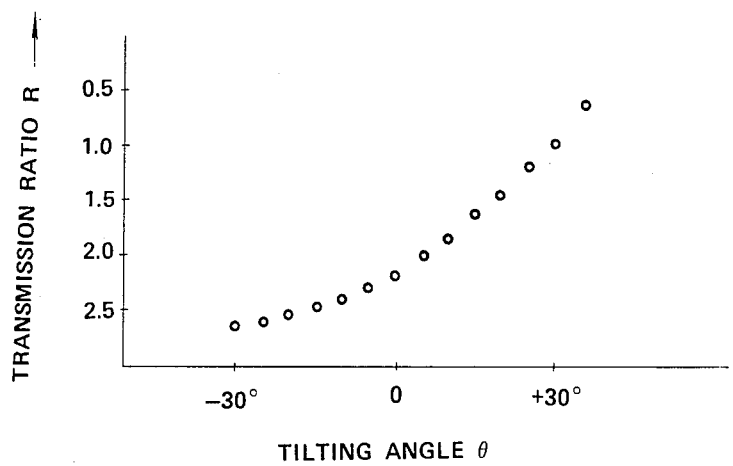
FIG. 10 is a graph showing a relationship between a tilting pivot angle and a transmission ratio in the conventional transmission.
Figure 11:
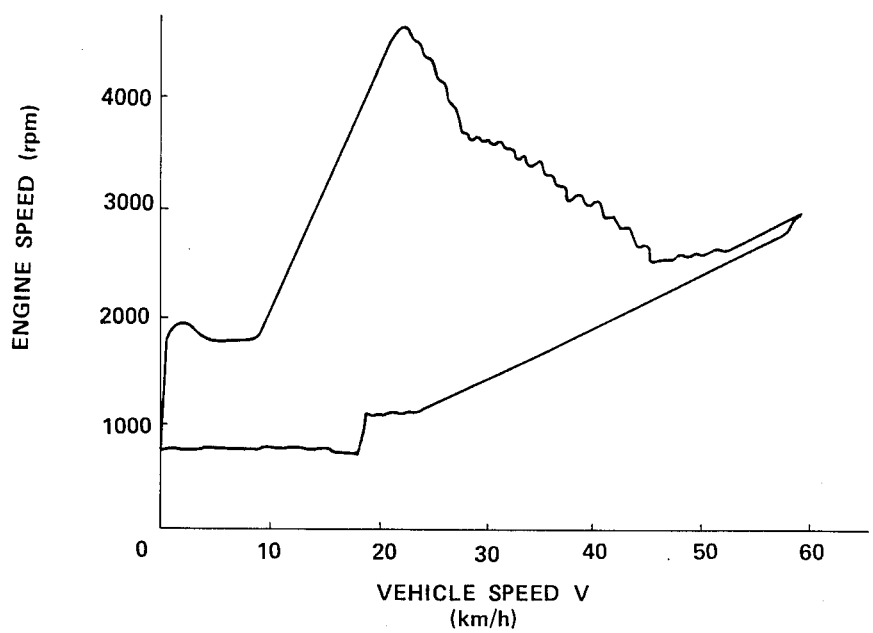
FIG. 11 is a graph showing a relationship between a vehicle speed and an engine rpm when the conventional transmission is applied to a transmission for vehicles.

Further, in the embodiment, in order to move the trunnions 6, 7 to control the transmission ratio R of the toroidal type infinitely variable transmission T, there is employed moving means comprised of solenoid operated directional control valves 10a and 10b, and hydraulic cylinders 9a to 9d. However, the present invention is not limited to the use of such moving means, but other moving means can be applicable to the present invention. For example, an infinitely variable transmission is described in Japanese Patent Laid-Open Publication No. 58-160664 (1983) in which the trunnions are moved by use of a ball screw which is driven to rotate by a pulse motor, and further, in the conventional toroidal type infinitely variable transmission (U.S. Pat. No. 4,434,675) mentioned in the foregoing, the power rollers are tilted by utilizing a spool type control valve and a precess cam. In this case, as a control device for the pulse motor, a control circuit 19' shown in FIG. 8 is applicable. In other words, the control circuit 19' includes correction means 30 for directly calculating a command tilting angle correction value Era based on external input signals, pulse number calculating means 31 for calculating, based on the command tilting angle correction value Era outputted from the correction means 30, the number of pulses which determines a rotational angle of the pulse motor, and pulse distributing means 32 for distributing a pulse output to each stator winding of the pulse motor 40, and the pulse motor 40 is controlled in a open-loop fashion. That is, the output of the pulse distributing means 32 is supplied to the pulse motor 40 which drives the ball screw or spool valve 41, and trunnions 6, 7 are moved by the ball screw or spool valve 41 thereby to control power rollers 4, 5 to pivot to a predetermined tilting angle $\theta$.

Further, in the embodiment described above, although the command tilting angle correction value Era is calculated from the command tilting angle Er by the correction means, instead of this, the detecting signal from the command angle detector 12 of the infinitely variable transmission T may be corrected by correcting means to obtain similar effects to the above embodiment.

What is claimed is:

1. A transmission ratio control apparatus of a toroidal type infinitely variable transmission comprising:

input disk and output disk mounted in a housing rotatably and coaxially, said input disk and output disk cooperating with each other to form a toroidal cavity therebetween;

a plurality of power rollers disposed in said toroidal cavity formed by both said disks;

a trunnion for each of said plurality of power rollers, each said trunnion rotatably supporting each said power roller and being movable and pivotable with respect to a pivot axis line which is at right angles to a rotation axis of each said power roller;

driving means for moving each said trunnion in a pivot axis direction;

a tilting angle detector for detecting a tilting angle of one of said plurality of power rollers;

command tilting angle selecting means, based on external input signals, for selecting a command tilting angle and for outputting a command value signal;

means for correction using said command value signal of said command tilting angle selecting means and said detection signal of said tilting angle detector, in order to make linear a transmission ratio with respect to said tilting angle; and control means for controlling tilting of said plurality of power rollers by outputting a control signal which controls said driving means, said control signal being outputted based on a correction value of said correction means and said detection signal of said tilting pivot angle detector and based on said command tilting angle.

2. An apparatus according to claim 1 wherein said driving means includes hydraulic cylinders disposed at opposite ends of said trunnion in an axial direction thereof, and a directional control valve, and wherein said directional control valve is operated to change over in accordance with said control signal from said control means.

3. An apparatus according to claim 1 wherein said driving means includes hydraulic cylinders disposed at opposite ends of said trunnion in an axial direction thereof, and a spool valve for driving said hydraulic cylinder, said spool valve being mechanically fed back with the movement of said trunnion, and wherein said spool valve is controlled by said control signal of said control means in an open-loop control fashion.

4. An apparatus according to any one of claims 1 to 3 wherein said correction means calculates a correction command tilting angle by performing a function calculation corresponding to a value of the command tilting angle based on the command tilting angle from said command tilting angle selecting means.

5. An apparatus according to any one of claims 1 to 3 wherein said correcting means determines a correction command tilting angle by looking up a storage table representing a relationship between the command tilting angle and the correction command tilting angle, said relationship being stored beforehand based on the command tilting angle from said command tilting angle selecting means.

* * * * *